United States Patent [19]
Crawford

[11] Patent Number: 5,671,956
[45] Date of Patent: Sep. 30, 1997

[54] VACUUM SYSTEM COUPLER

[75] Inventor: Charles K. Crawford, Wilton, N.H.

[73] Assignee: Kimball Physics, Inc., Wilton, N.H.

[21] Appl. No.: 612,381

[22] Filed: Mar. 7, 1996

[51] Int. Cl.⁶ ........................................ A16L 25/00
[52] U.S. Cl. .................... 285/328; 285/363; 285/416; 285/917
[58] Field of Search ................... 285/363, 413, 285/414, 415, 416, 31, 328, 19, 917

[56] References Cited

U.S. PATENT DOCUMENTS

| | | | |
|---|---|---|---|
| 1,821,867 | 9/1931 | Wilson | 285/363 X |
| 2,900,199 | 8/1959 | Logan | 285/363 X |
| 2,984,504 | 5/1961 | Boughton | 285/413 X |
| 3,208,758 | 9/1965 | Carlson et al. | 277/171 |
| 4,303,251 | 12/1981 | Harra et al. | 277/236 |
| 4,874,192 | 10/1989 | Key | 285/413 X |
| 4,919,391 | 4/1990 | Kemp | 285/414 X |
| 5,163,712 | 11/1992 | Sabo et al. | 285/7 |
| 5,421,624 | 6/1995 | Hayashi et al. | 285/370 X |

OTHER PUBLICATIONS

Kimball Physics, Inc.; "Electron Optics/Ion Optics"; Product Catalog; Jul. 1994.

*Primary Examiner*—Dave W. Arola
*Attorney, Agent, or Firm*—Hayes, Soloway, Hennessey, Grossman and Hage, P.C.

[57] ABSTRACT

An improved all-metal coupler for coupling vacuum components. The coupler comprises a hollow tube terminating at each end in a flange. At least one of the flanged ends comprises a plurality of radially outwardly extending tabs or lugs for accommodating the bolt holes. In a preferred embodiment of the invention, the coupler is machined from a unitary piece of metal.

17 Claims, 3 Drawing Sheets

VACUUM SYSTEM COUPLER

BACKGROUND

This invention relates to vacuum couplers. The invention has particular utility for mating together vacuum system components for use, for example, in ultra-high vacuum systems, and will be described in connection with such utility, although other utilities are contemplated, including non-vacuum applications.

DESCRIPTION OF PRIOR ART

Vacuum systems find wide applications in research, education, product development and production. Typical systems are comprised of independent and interchangeable components. Components include testing chambers, pumps, gauges, valves, specimen holders, testing apparatus, heating systems and cooling systems.

Processes or experiments that require high or ultra high vacuum (UHV) currently employ all-metal vacuum joints. A typical all-metal joint from U.S. Pat. No. 3,208,758 is illustrated in FIG. 1. Such a joint comprises a flange 60 that includes an annular recess 30 and an annular knife edge 35. The flange 60 is intended for mating with another like flange 60 separated by a soft, metallic gasket 65. The opposing knife edges 35 are pressed into the gasket 65 by tightening bolts (not shown) forming the UHV seal.

In UHV systems the level of vacuum is dependent upon the speed of the vacuum pumps, the leak rates of the vacuum joints and vacuum walls, the surface area of the chamber and pumping lines, and the surface roughness of the interior components. Cleanliness or purity of the vacuum environment depends upon the interior component's material, forming method, end surface finish. The practicality of a vacuum system depends on its ease of access for changing specimens, the required downtime to troubleshoot and do repairs, and the ease at which components can be added and removed from the system. The expense of a vacuum system lies in the cost of components, the required pump types and speeds, end the number and type of extra adapters needed to attach components to a system. Moreover, accurate placement of testing apparatus, processing equipment or samples within a system is often required for an experiment or process. Existing prior art flange connectors do not adequately optimize many of these needed requirements.

Referring to FIG. 2, a typical prior art coupler comprises two pre-machined flanges 72, 74, welded on opposite ends of an extruded or welded tube 76. A plurality of holes 78 are formed in flanges 70, 72 for accommodating bolts. Holes 78 may comprise clear holes, threaded holes, or a combination of clear holes and threaded holes and may include blind threaded holes. Such prior art couplers of this type add significant length, volume, surface area, and inaccuracies to the system. Adding length and surface area decreases conductance, the ease at which gas can flow, and increases the likelihood of contaminates in the system. With decreased conductance and increased volume, a system will need larger, more expensive pumps in order to achieve the same vacuum level. The likelihood of contaminants in the system increases since the extruded or welded extension tube generally has a rough surface finish. The welded flanges also inherently have poor parallelism and are possible sources of leaks.

Such prior art welded flange couplers depend on a thick flange 72, 74 for transferring the closing force of the bolts to a sealing force on the gasket, making this a clumsy assembly. Also, a large component, such as a pump, is not easily mounted horizontally "cantilever style" from a welded flange coupler due to the relative weakness of the thin walled extension tube 76. Also, thin wailed extension tubes 76 cannot have internal mounting systems that require mounting grooves in the extension tube wall.

Also, with prior art devices, to provide feedthrough from atmosphere into a vacuum chamber the testing apparatus is independently mounted within the vacuum chamber and the feedthrough is mounted on a chamber port. With this arrangement, attachments such as electrical wiring must be done and redone whenever the apparatus is removed from the system. Having to needlessly redo complicated connections causes in creased system downtime for repairs or component changes, and also leads to possible errors when re-connections are made.

OBJECTS OF THE INVENTION

It is thus an object of the present invention to provide a coupler which overcomes the aforesaid and other disadvantages of the prior art. Another object of the invention is to provide a coupler, compatible with existing vacuum components, but having a reduced length, an increased accuracy and an enhanced rigidity as compared to prior art couplers.

SUMMARY OF THE INVENTION

According to the present Invention, these and other objects and advantages are achieved in an all-metal coupler in which at least one of the flanged ends is formed integrally with the extension tube, and both flanged ends comprise a plurality of radially end laterally staggered tabs or lugs for accommodating the bolt holes.

BRIEF DESCRIPTION OF THE DRAWINGS

Still other objects and advantages of the present invention will be apparent from the following detailed description taken in conjunction with the following drawings, in which like numerals depict like parts, and wherein.

DESCRIPTION OF PREFERRED EMBODIMENT

Figure 3:
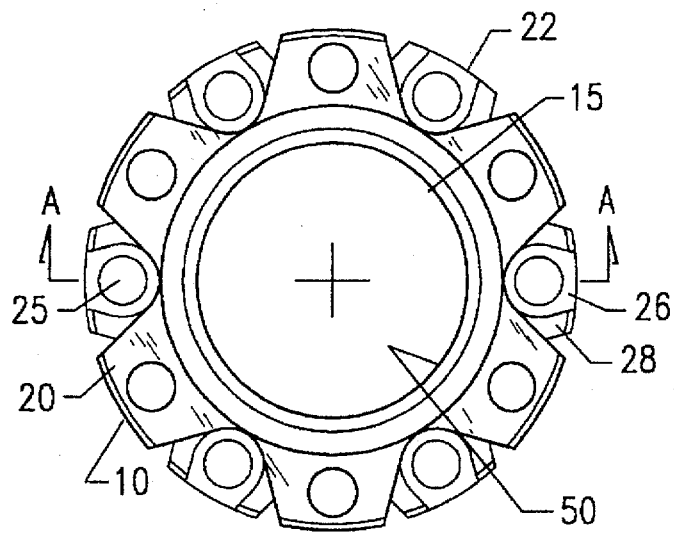
FIG. 3 is a top view of an all-metal coupler made in accordance with the present invention.

Referring to FIG. 3, there is shown a preferred embodiment of a coupler 10 made in accordance with the present invention, and having a sealing surface 15 to crush a metallic gasket 65 in known manner. A plurality of bolt holes 25 are located on a plurality of tabs or lugs 20, 22 to provide a method of securing the coupling flange 10 to another component (not shown) with a compatible sealing surface.

Figure 4:
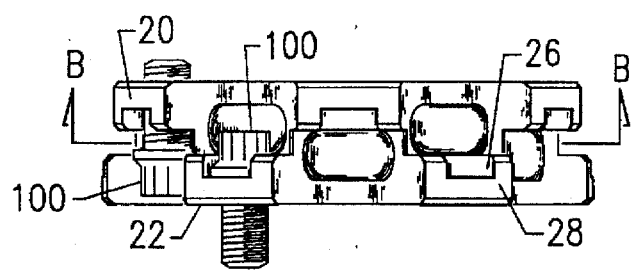
FIG. 4 is a side elevational view of the coupler of FIG. 3.

Referring also to FIG. 4, tabs 20 and 22 are staggered radially and laterally relative to one another so as to allow for bolt 100 and wrench clearance. Preferably tabs 20 and 22 are rotated with respect to one another by one-half their respective radial spacing, i,e. so as to provide maximum bolt and wrench clearance. Also, in a preferred embodiment of the invention, tabs 20 and 22 are cut out at 26 to provide clearance for maximum bolt length. However, cutouts 26 have little effect on the strength of the tabs and resistance to deformation since the force is transferred to and carried on the thicker wait areas 28 and inner web 45 as will be described in detail hereinafter.

Figure 5:
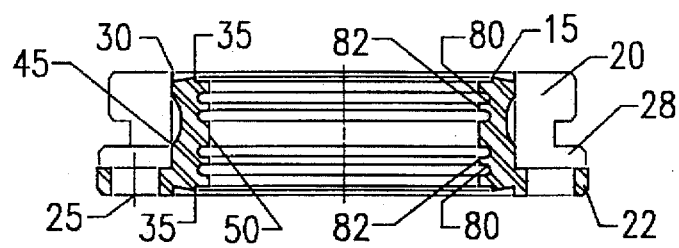
FIG. 5 is a cross-sectional view taken along A—A of FIG. 3.
Figure 6:
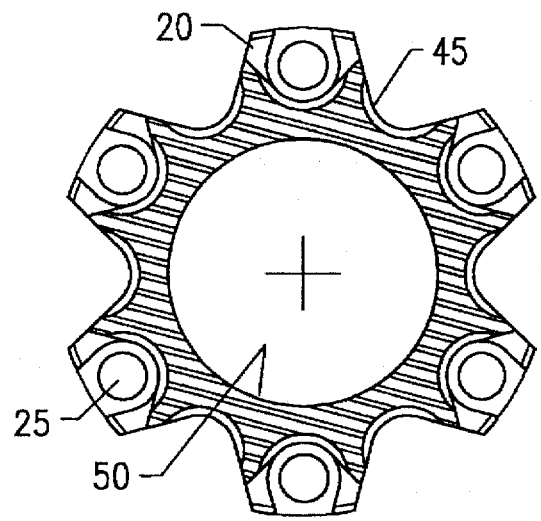
FIG. 6 is a cross-sectional view taken along B—B of FIG. 4.

FIGS. 3 and 5 show the details of the sealing surface 15 including a knife edge 35. The tabs 20, 22 and bolt holes 25 are sized such that a bolt (not shown) will not interfere with an outer diameter of the sealing surface 30 to allow for the use of a standard metallic gasket 65. To allow the mounting of internal vacuum components, a set of equipment mounting grooves 80, 82, may be cut into the inner wall surface 50 of the flange 10, as taught in co-pending application Ser. No. 08/399,906, filed Mar. 7, 1995, and assigned to the common assignee.

Inner web 45 and wall areas 28 provide strength and rigidity to the coupling flange 10. The force exerted on the tabs 20 and 22 by the mounting bolts (not shown) Is effectively transferred by the cylindrical inner web 45 to the sealing surface 15 which crushes the metallic gasket 65. Without the support of the inner web 45 and wall areas 28, the tabs 20 and 22 could deflect under a load causing non-uniform gasket crushing.

The coupler 10 may be formed from a unitary piece of metal, by precision machining. Since all the surfaces may be machined, there are no welds to cause alignment problems. Also, surface finishes are superior to prior art couplers, particularly the inner surface 50 of the coupler. As a result, the amount of contaminants introduced into the vacuum system from the surface may be reduced. Machining both flange surfaces from a single piece of metal also produces highly accurate lengths, diameters and flange face parallelism not achievable by prior art built-up welding techniques.

Figure 2:
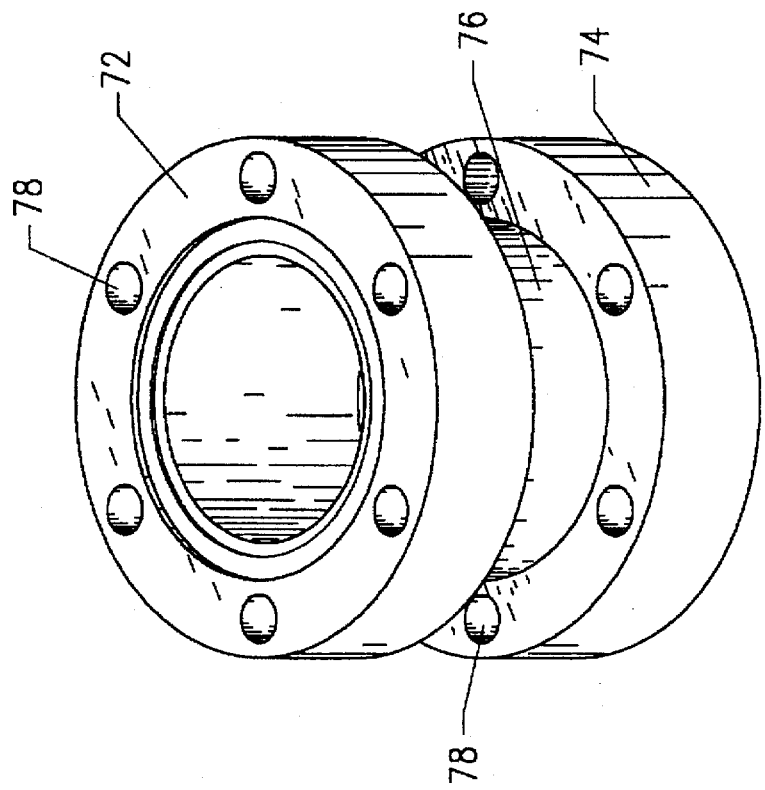
FIG. 2 is a perspective view of a prior art all-metal coupler.
Figure 1:
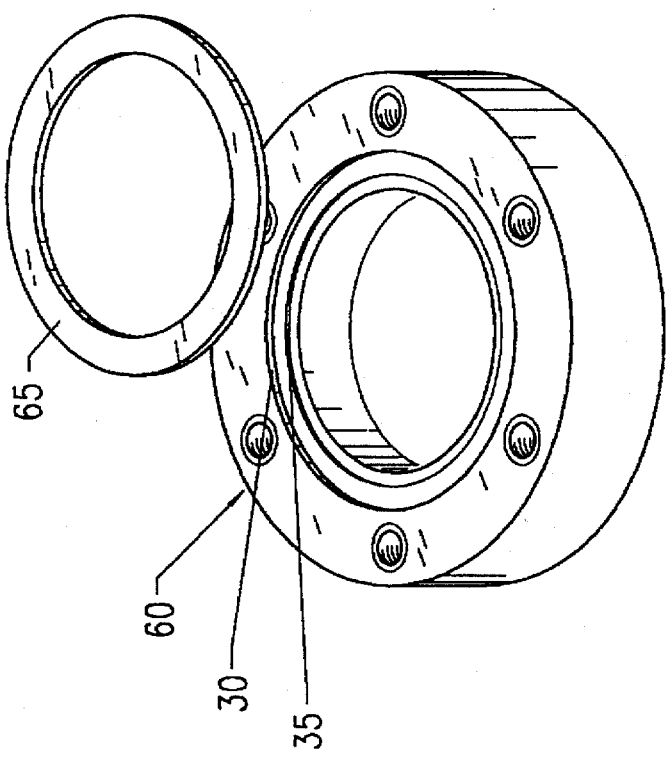
FIG. 1 is an exploded view of a prior art all-metal joint.

The invention has other advantages. For example, the couplers may be made shorter than prior art coupler. By way of example, the shortest commercially available prior art coupler for UHV applications, FIG. 2 has an overall length of 1.75 inches, and requires studs and nuts to be used since it is impossible to insert a standard length bolt due to interference by the opposing flange, as well as interference by the head of the opposing bolt. Moreover, a shorter bolt cannot be used with prior art couplers without sacrificing thread engagement length. Thus, using standard bolts, Prior art couplers need to be approximately 2.1 inches in length. Couplers made in accordance with the present invention are available in lengths ranging from 0.68 inches, end employ shorter bolts, without sacrificing thread engagement length. Furthermore, reducing the flanges to tabs, and using the inner web of the coupler To Transfer the closing force from the bolts to the sealing force on the gasket allows for reduced weight compared to thick flanges of prior art couplers, At the same time, the tubular body portion of the coupler may be made with thicker walls as compared to prior art couplers. And, staggering the webs and holes permits the insertion of longer bolts than is possible with conventional flanged couplers.

Figure 7:
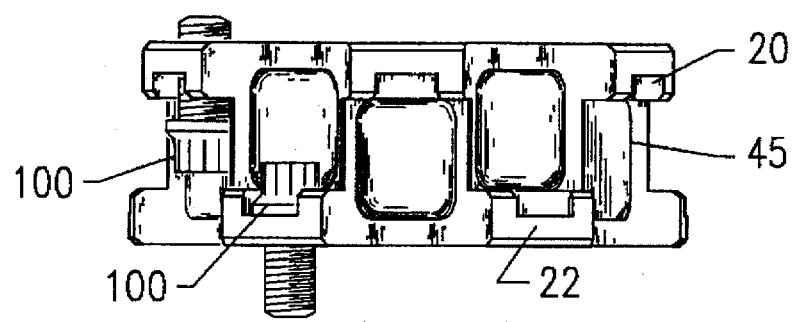
FIGS. 7 and 8 are side elevational views of a longer length all-metal couplers made in accordance with the present invention.
Figure 8:
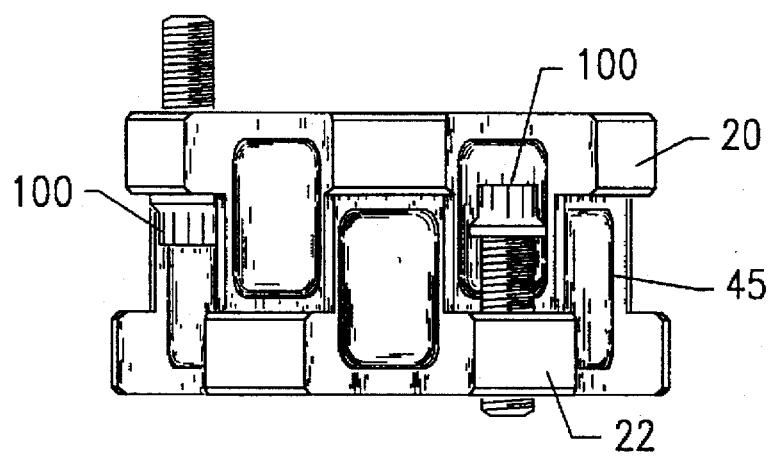
Figure 9:
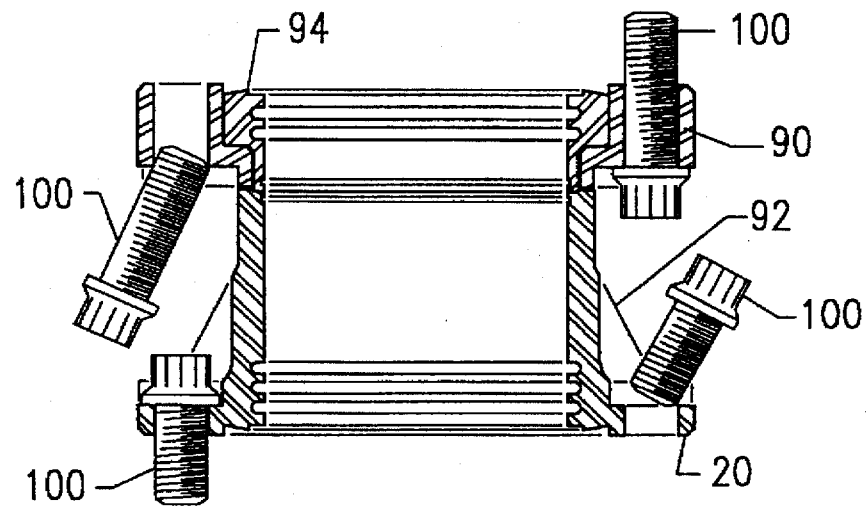
FIG. 9 is a gross-sectional view of yet another embodiment of the invention.

The invention is susceptible to modification. For example, as shown in FIGS. 7 and 8, when making longer length couplers, tabs 20 and 22 need not be cutout or recessed since bolt clearance is adequate under normal circumstances. Also, on longer length versions, radial ports (not shown) could be added to increase access to interior components. Similarly, tees and crosses (also not shown) could be formed with integral tabs in accordance with the present invention. Also, as shown in FIG. 9, a rotatable flange 90 may be rotatably retained on coupler body 92 by means of a rotatable flange retaining ring 94, which in turn is welded to body 92 in a conventional manner.

Also, it is not necessary to evenly space the bolt holes around the coupler. For example, four sets of double bolt holes may be provided in corresponding tabs, instead of the standard eight evenly spaced bolt holes in eight evenly spaced tabs. This arrangement would allow space for smaller all-metal vacuum joints or other components to be added on the sides of the coupler.

The coupler in accordance with the present invention has many advantages over the prior art. The most advantageous feature is the reduced length. Decreasing the space required to attach components together reduces overall vacuum system size. Reduced length also increases the vacuum system's conductance. Increasing the conductance of a rigueur system reduces the pump size and speed required to achieve the same level of vacuum throughout the system. A small vacuum system with small pumps is less expensive to build than a system requiring large pumps.

Another advantage of the coupler of the present invention is the precision with which it can be manufactured. The entire coupler is preferably made out of one piece of metal. Tight tolerances may be held on many of the coupler features since welding is eliminated. Welding causes metal to deform in a non-uniform and unpredictable manner. Alignment of vacuum components and mating of interior system components requires high dimensional precision. Thus, when using prior an couplers, it is not practical to rely solely on its dimensions, the eminent inaccuracies need expensive compensations.

Also, the coupler of the present invention could yield benefits when used as a feedthrough flange. A feedthrough flange for a vacuum system needs to be "vacuum tight" while providing a method of connecting items in a vacuum system to items outside the system. An advantage of the coupler of the present invention lies in the ability to connect the feedthrough to an interior component, such as an electron gun, independent of the feedthrough mounting to the vacuum system. Thus, the connection does not need to be done at the location of the vacuum system since the component can be mounted within the coupler, becoming an independent subsystem. Should the component need to be removed from the vacuum system, the connection does not need to be disassembled and subsequently reassembled as a result of the component being remounted. This saves time, and may reduce the number of ports required on a vacuum system's main chamber.

Still other changes may be made without departing from the spirit and scope of the invention.

I claim:

1. An all-metal vacuum flange coupler comprising a unitary body in the form of a hollow extension tube terminating at each end in a flange, each said flange including a sealing surface, and comprising a plurality of radially outwardly extending tabs or lugs for accommodating bolt holes, wherein the tabs or lugs of one flange are offset radially with respect to the tabs or lugs of the opposite flange, said coupler further comprising an annular recess and an annular knife edge formed in the sealing surface of each flange for engaging a metal gasket.

2. A coupler according to claim 1, wherein said tube and said flange each have a circular cross-section.

3. A coupler according to claim 1, wherein said tabs or lugs include a portion of reduced thickness.

4. In a coupler according to claim 1, the improvement wherein said tube includes means for supporting components within the coupler.

5. A coupler according to claim 1, and further comprising at least one groove formed in the interior surface of said tube for accommodating mounting assemblies for internal apparatus within said coupler.

6. A coupler according to claim 1, wherein at least some of said bolt holes comprise clear holes.

7. A coupler according to claim 1, wherein at least some of said bolt holes comprise threaded holes.

8. A coupler according to claim 7, wherein at least some of said threaded holes comprise blind threaded holes.

9. A coupler according to claim 1, wherein the coupler is machined from a unitary piece of metal.

10. An all-metal vacuum flange coupler comprising an extension tube having a rotatably mounted flange at one end and a fixed flange at the other integrally formed with said extension tube end thereof, said fixed flange comprising a plurality of radially extending tabs or lugs for accommodating bolt holes, each of said flanges having a sealing surface including an annular recess and an annular knife edge formed therein for engaging a metal gasket.

11. A coupler according to claim 10, wherein said tube has a circular cross-section.

12. A coupler according to claim 10, wherein said tabs or lugs include a portion of reduced thickness.

13. A coupler according to claim 10, and further comprising at least one groove formed in the interior surface of said tube for accommodating mounting assemblies for internal apparatus within said coupler.

14. A coupler according to claim 10, wherein at least some of said bolt holes comprise clear holes.

15. A coupler according to claim 10, wherein at least some of said bolt holes comprise threaded holes.

16. A coupler according to claim 15, wherein at least some of said threaded holes comprise blind threaded holes.

17. A coupler according to claim 10, wherein the extension tube and fixed flange are machined from a unitary piece of metal.

* * * * *